United States Patent [19]

Izawa et al.

[11] Patent Number: 5,394,194
[45] Date of Patent: Feb. 28, 1995

[54] GAIN CONTROL CIRCUIT AND GRADATION CORRECTING APPARATUS

[75] Inventors: Yosuke Izawa; Naoji Okumura, both of Osaka, Japan

[73] Assignee: Matsushita Electric Industrial Co., Ltd., Osaka, Japan

[21] Appl. No.: 9,878

[22] Filed: Jan. 27, 1993

[30] Foreign Application Priority Data

Feb. 7, 1992 [JP] Japan .................. 4-021529

[51] Int. Cl.⁶ .......................... H04N 5/52; H04N 5/20
[52] U.S. Cl. ........................ 384/672; 348/678
[58] Field of Search ............... 358/166, 168, 169, 163, 358/174; H04N 5/20, 5/202, 5/52; 382/54; 348/28, 678, 686, 672

[56] References Cited

U.S. PATENT DOCUMENTS

| | | | |
|---|---|---|---|
| 4,187,519 | 2/1980 | Vitols et al. | 358/169 |
| 4,771,192 | 9/1988 | Jackson | 348/678 |
| 4,797,744 | 1/1989 | Klemmer | 358/174 |
| 5,048,110 | 9/1991 | Nakajima | 382/54 |
| 5,089,891 | 12/1992 | Yamamoto | 358/174 |
| 5,099,330 | 3/1992 | Fuse et al. | 348/678 |
| 5,220,427 | 6/1993 | Mikami | 348/678 |
| 5,294,986 | 3/1994 | Isuji | 348/672 |
| 5,315,389 | 5/1994 | Izawa et al. | 348/672 |

FOREIGN PATENT DOCUMENTS

| | | | |
|---|---|---|---|
| 0235042 | 2/1987 | France | H04N 5/20 |
| 192468 | 9/1985 | Japan | 358/166 |
| 106589 | 4/1989 | Japan | H04N 5/52 |
| 241988 | 9/1989 | Japan | H04N 5/52 |
| 2019070 | 1/1990 | Japan | H04N 1/411 |
| 4-8068 | 1/1992 | Japan | H04N 5/20 |
| 4023570 | 1/1992 | Japan | H04N 5/202 |
| 4-45486 | 2/1992 | Japan | H04N 5/20 |
| 4047766 | 2/1992 | Japan | H04N 5/20 |
| 4077179 | 3/1992 | Japan | H04N 5/20 |

OTHER PUBLICATIONS

R. H. J. Brush & P. E. Baylis, "Contrast Expansion Processor", *Wireless World*, pp. 611–613, vol. 79, No. 1458, (Dec. 1973).

*Primary Examiner*—James J. Groody
*Assistant Examiner*—Chris Grant
*Attorney, Agent, or Firm*—Ratner & Prestia

[57] ABSTRACT

A small scale gain control circuit for controlling gain correction quantity is realized, using the configuration of an inverter, a subtraction circuit, a limiter, and a multiplication circuit. Gain correction quantity is controlled in such a way that in the gradation correcting apparatus a first constant fixes a value beyond which gain correction quantity is zero and a second constant fixes an inclination of the characteristics line.

2 Claims, 5 Drawing Sheets

GAIN CONTROL CIRCUIT AND GRADATION CORRECTING APPARATUS

BACKGROUND OF THE INVENTION

1) Field of the Invention

The present invention relates to a gradation correcting apparatus and specifically to a gradation correcting apparatus for use in television receivers, video tape recorders, video projectors, and the like. In particular a gain control circuit for controlling the quantity of correction applied an input image in order to automatically adjust that image is disclosed.

2) Description of the Prior Art

A gradation correcting apparatus automatically acts on a video gradation signal (which includes information such as picture brightness and picture contrast) to obtain a television picture with optimum contrast. With the recent trend towards high quality television receivers, such devices have received much attention.

A gradation correcting apparatus typically includes a gain control circuit in order to control correction quantity.

A conventional gradation correcting apparatus, including a gain control circuit, is explained with reference to the block diagram shown in FIG. 1.

The gradation correcting apparatus comprises: a histogram memory 5 for representing brightness distribution of an input brightness signal; a look up table (LUT) arithmetic circuit 6 for performing accumulative addition of frequency in the histogram, and thereafter normalizing each accumulative frequency as described later; a look up table memory 7 for storing the normalized accumulative frequency supplied from the LUT arithmetic circuit 6 and supplying a correction quantity in response to the brightness level of the input brightness signal; a maximum value detecting circuit 8 for detecting the maximum value of difference between adjacent normalized accumulative frequencies in the LUT arithmetic circuit 6; a gain control circuit 9 for supplying correction quantity in response to the maximum value of difference in the maximum value detecting circuit 8; and a multiplication circuit 10 for multiplying an output of the LUT memory 7 by an output of the gain control circuit 9 and sending a gradation correcting signal.

Operation of the gradation correcting apparatus will now be explained with reference to FIG. 2a–e, in which each characteristic graph shows a step in the consecutive conversion of a brightness signal within the gradation correcting apparatus. For purposes of this explanation, it is assumed that an input brightness signal is valued in 256 gradations as expressed by an 8-bit binary scale.

First, a brightness distribution of the input brightness signal a is obtained. This brightness distribution is obtained through a horizontal sweep which comprises a train of pixels. The brightness of each pixel or each sampled pixel is measured and classified into 256 brightness grades. The frequency of each brightness grade may be counted and presented in the form of a histogram as shown in FIG. 2(a). This brightness distribution is stored in the histogram memory 5. The contents of the memory 5 are cleared off and the memory 5 is set to zero once every one vertical scanning duration (or integer multiple thereof).

Next, the LUT arithmetic circuit 6 (which may include, for example, an arithmetic logic unit or a microprocessor) conducts the accumulative addition of frequency in the histogram, calculates the normalization coefficient such that the maximum accumulative frequency as obtained in the last accumulative addition is equal to the maximum value 256, and multiplies each accumulative frequency by the multiplication coefficient, as shown in FIG. 2(b).

The result b of the preceding procedure is stored in the LUT memory 7.

Whenever an input brightness signal a is received by the LUT memory 7, a correction signal c is transmitted therefrom. The value of the correction signal c is given by the algorithmic operation such that correction value equals (normalized accumulative frequency (dimensionless) minus input brightness value (dimensionless)), thus leading to the characteristic graph as shown in FIG. 2(c). This graph provides for correction of picture brightness such that lower brightness level are reduced while higher brightness level are increased. In other words, this graph provides for enhanced contrast.

Put another way, c=b (the accumulative addition of frequency)—45° line of accumulative addition of frequency. Alternatively, correction signal c is the difference between an input image and an image having ideal gradation.

By means of the maximum value detecting circuit 8, the maximum value of difference d between adjacent normalized accumulative frequencies as indicated in FIG. 2(b) is detected, and sent to the gain control circuit 9.

Next, by means of the gain control circuit 9, the maximum value of difference d is converted to a value of a gain correction signal e according to the characteristic graph shown in FIG. 2(d), which is obtained by expertise of this art. The more concentrated the input brightness values are in a certain brightness level, the larger the maximum value of difference d becomes. The graph shown in FIG. 2(d) indicates that in the case of concentrated input brightness values, the value of the gain correction signal e has to be reduced.

The gain correction signal e transmitted from the gain control circuit 9 determines the resultant gain of the multiplication circuit 10 as the value of the gain correction signal divided by the number 256. For example, when the value of the gain correction value is 128, the gain is ½, thus the value of the outgoing signal, i.e., a gradation correction signal f, becomes half the value of the incoming signal, i.e., the correction signal c. The plot of the value of the gradation correction signal f against the value of the brightness signal a is shown in FIG. 2(e). Correction signal f is added to the input brightness signal a at the addition circuit 11, resulting in the corrected brightness signal g.

The gain control circuit 9 includes a read only memory (ROM), and the characteristic as shown in FIG. 2(d) is written into the ROM.

The gain control circuit 9 transmits the gain correction signal e upon receipt of the maximum value of difference d.

Unfortunately, gain control circuits incorporating a ROM are complex and large. This results in a large PC board and a high cost.

SUMMARY OF THE INVENTION

A gain control circuit according to the present invention comprises: an inverter for inverting an input signal; a subtraction circuit for subtracting the first constant from an input signal; a limiter for passing an input signal when it is not less than zero, and stopping it when it is otherwise; and a multiplication circuit for multiplying a signal by the second constant.

In the above mentioned configuration, according to the present invention, gradation correction control is easily realized in such a way that when a variable exceeds a value specified by the first constant, the variable is set to zero by the limiter, and when it is not more than the first constant it varies in the way specified by the second constant, thus sending a gain control signal.

DESCRIPTION OF THE PREFERRED EMBODIMENT

Figure 1:
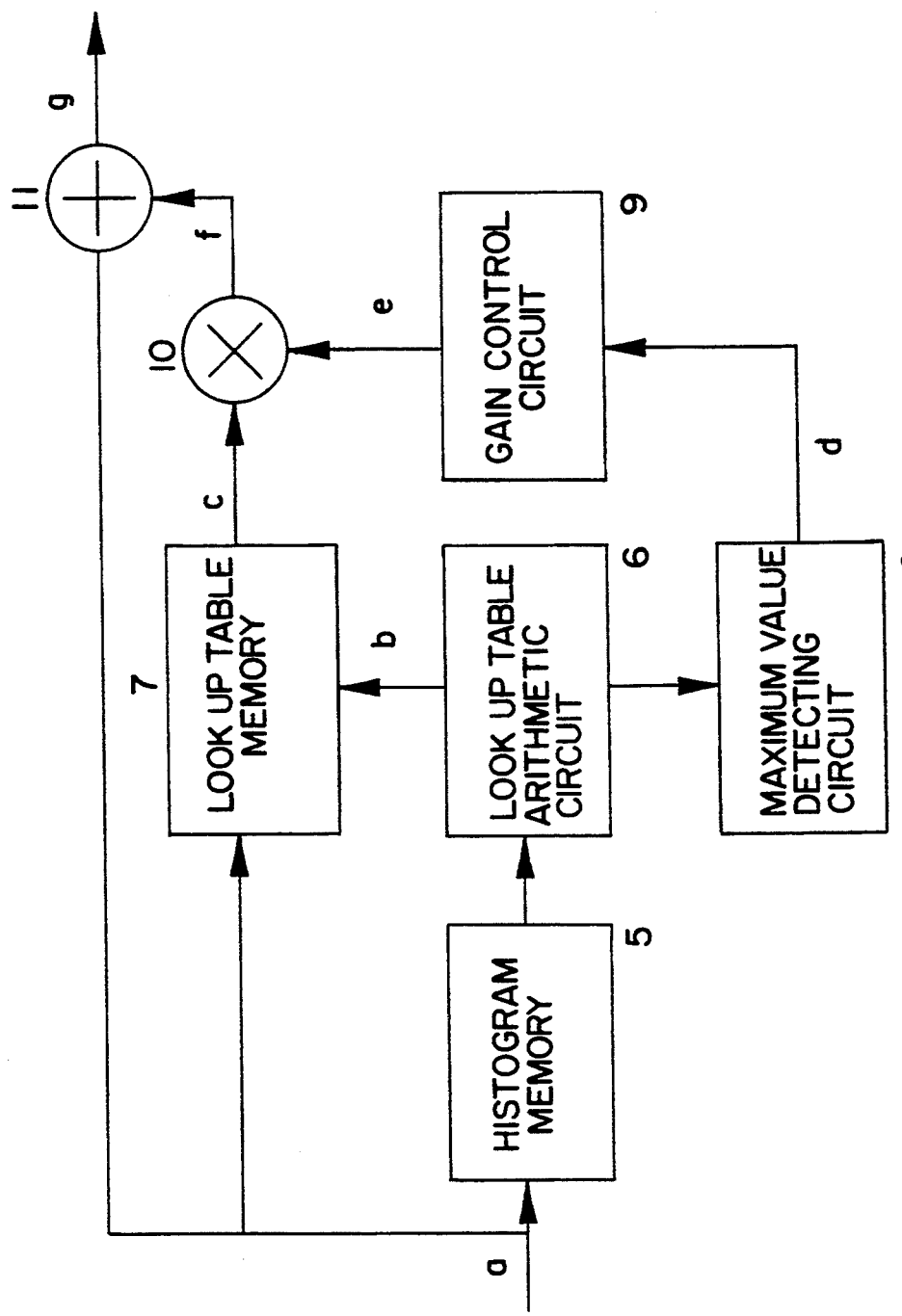
FIG. 1 is a gradation correction apparatus including a conventional gain control circuit.
Figure 2A:
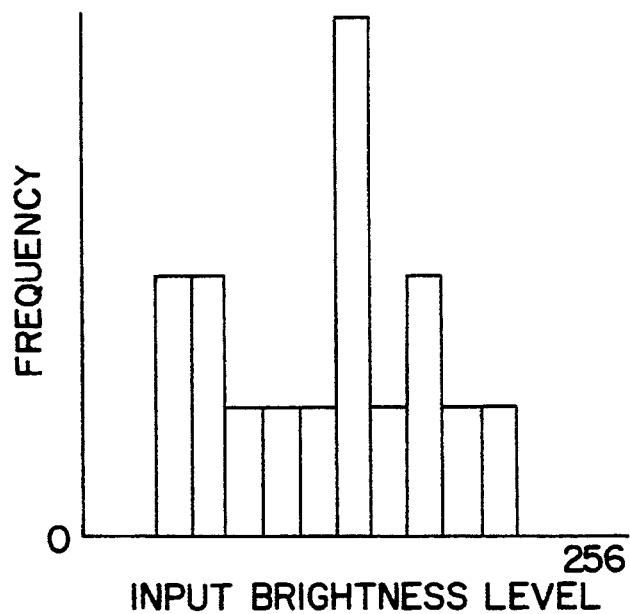
FIGS. 2a–e are a set of graphs for explaining the function of a conventional apparatus.
Figure 2B:
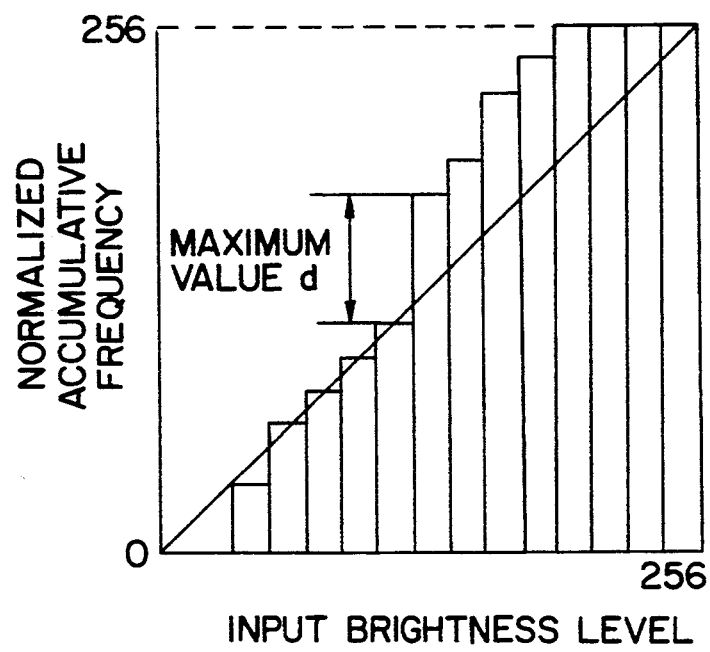
Figure 2C:
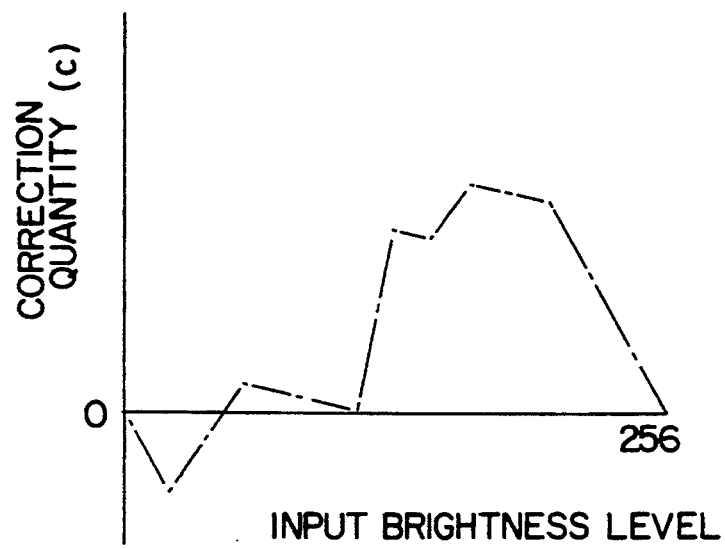
Figure 2D:
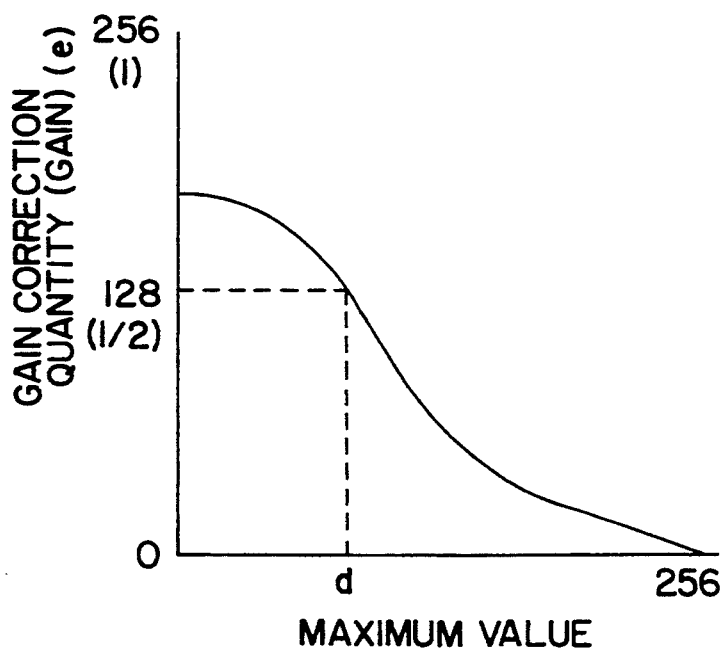
Figure 2E:
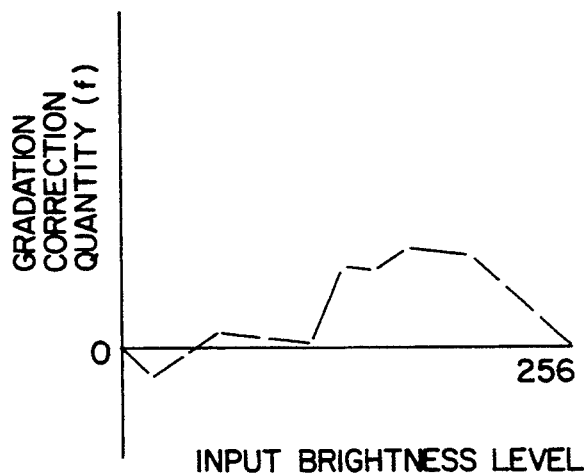
Figure 3:
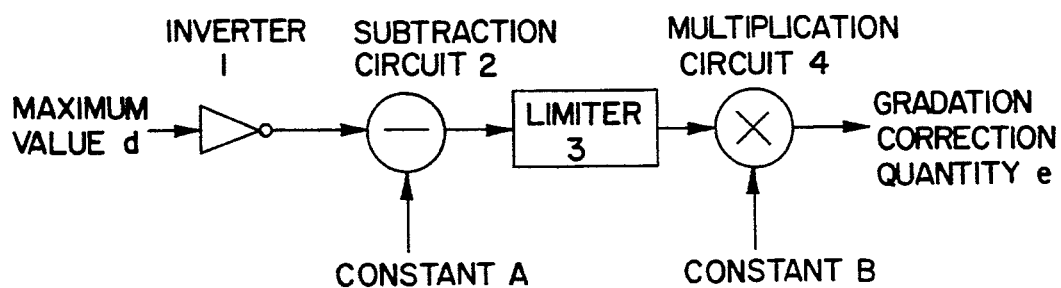
FIG. 3 is a block diagram of an exemplary embodiment of a gain control circuit in accordance with the present invention.

An exemplary embodiment of a gain control circuit in accordance with the present invention is now explained. FIG. 3 is a block diagram of the gain control circuit comprising: an inverter 1 for inverting a signal, a subtraction circuit 2 for subtracting the first constant A from an input signal, a limiter 3 for sending zero signal if an input signal is less than zero, and a multiplication circuit 4 for multiplying an input signal by the second constant B.

In this configuration, the function of the gain control circuit is now explained.

First, a signal indicative of the maximum value of difference d as previously defined in the histogram of normalized accumulative frequency versus input brightness level is transmitted to the inverter 1. Then, the output signal from the inverter 1 is transmitted to the subtraction circuit 2, being subtracted from by the first constant A.

Next, the output signal from the subtraction circuit 2 is transmitted to the limiter 3, transmitting an output signal of zero when the input signal is less than zero, or passing the signal with no modification when the signal is no less than zero. Then, the output signal from the limiter 3 is multiplied by the second constant B by the multiplication circuit 4, thus sending a gain correction signal e.

Figure 4:
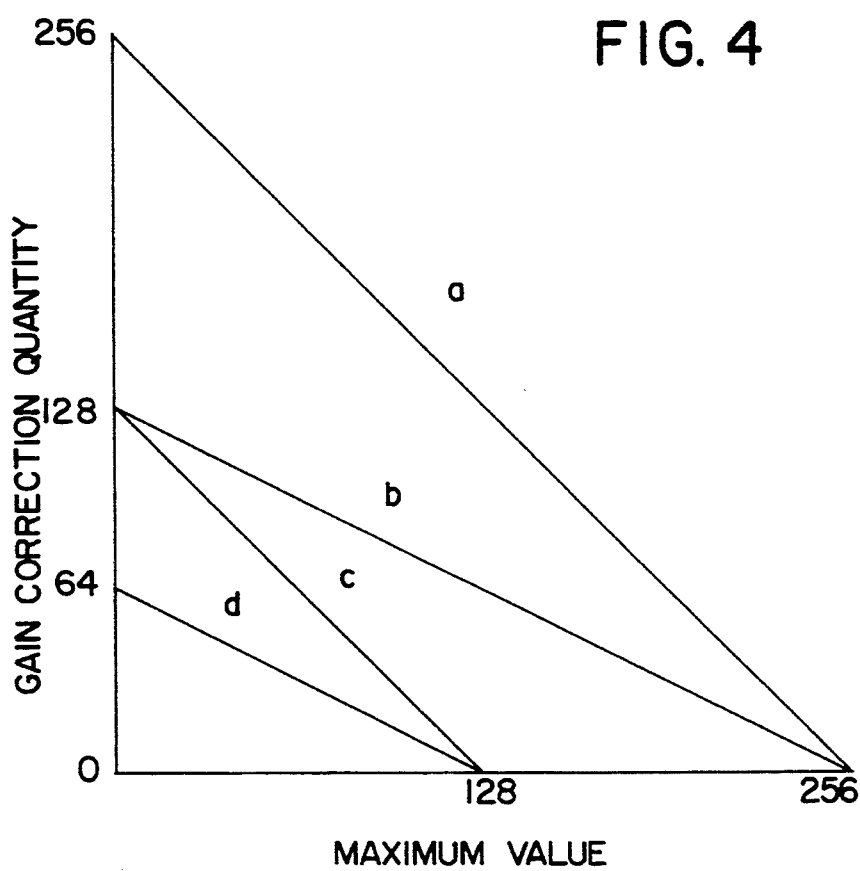
FIG. 4 is a graph for explaining the function of an embodiment of a gain control circuit in accordance with an exemplary embodiment of the present invention.

The characteristic of gain correction quantity versus maximum value as obtained in the preceding procedure is shown in FIG. 4.

In the above description, the constants A and B are determined so as to get an optimum correction by expertise of this art.

In FIG. 4, a line a when the constant A is zero and the constant B is 1 is obtained. A line b with an inclination of ½ when A is zero and B is ½ is also obtained. Furthermore, a line c when A is 128 and B is 1 is obtained. A line d with an inclination of ½ when A is 128 and B is ½ is obtained as well. In the range that a maximum value d is more than 128 in the last two cases, a horizontal zero line is obtained. For example, to keep gain correction quantity zero in the range a maximum value is more than 192, the constant A is desirably fixed to 64.

Figure 5:
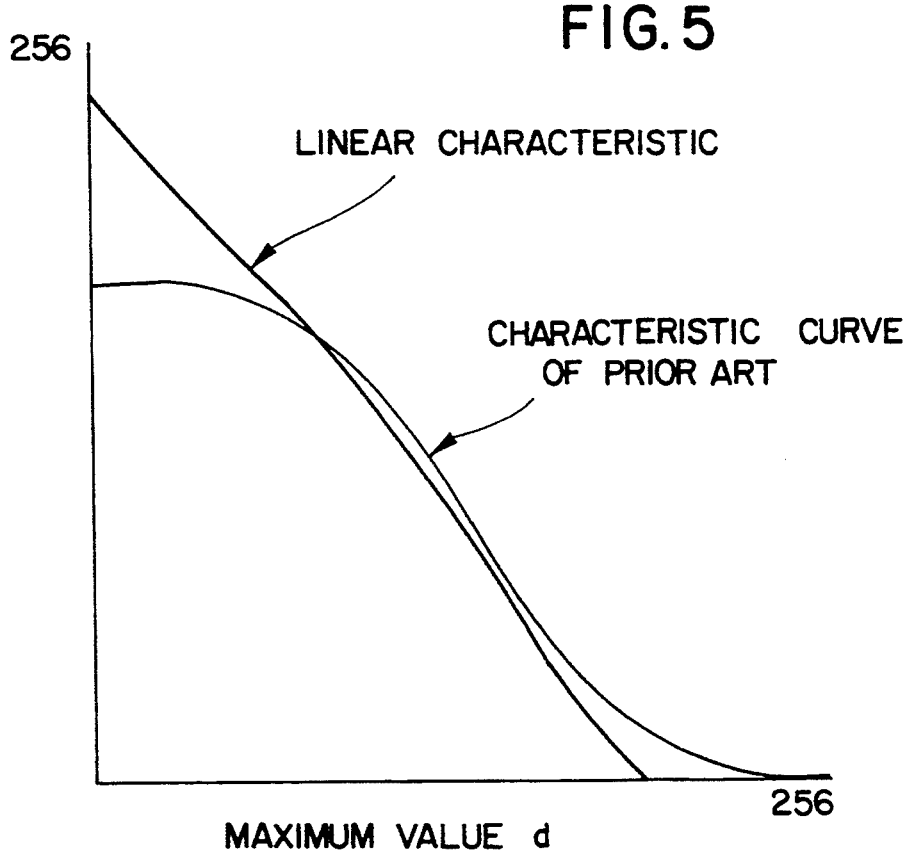
FIG. 5 is a graph for illustrating how the linear characteristics of the present invention approximately coincide with a portion of the characteristic curve of the prior art.

In this manner, as shown in FIG. 5, constant A and constant B are determined such that the linear characteristics approximately coincide with a portion of the characteristic curve of the prior art.

By means of the above mentioned procedure, gain correction quantity in the gradation correcting apparatus is controlled. This is accomplished through use of the first constant which sets a value beyond which gain correction value is zero and through the use of the second constant which determines an inclination of the line in the characteristic shown in FIG. 4.

As described in the exemplary embodiment of the present invention, gain correction quantity in the gradation correcting apparatus can be realized on a smaller scale and easily put into practice by means of the gain control circuit comprising an inverter, a subtraction circuit, a limiter, and a multiplication circuit, with the first constant which fixes a value beyond which gain correction quantity is zero and the second constant which fixes an inclination of the line as drawn in FIG. 4.

What is claimed is:

1. A gradation control circuit for processing an input image signal having a distribution histogram of brightness level, said gradation control circuit comprising:
   a gain control circuit comprising:
   (a) an inverter for inverting a gain control input signal to generate an inverted signal, said gain control input signal is a maximum value of the distribution histogram of brightness level,
   (b) means for subtracting a signal representative of a first constant from said inverted signal to generate a subtracted signal,
   (c) limiter means for generating (1) an output signal of zero value when said subtracted signal is less than zero, and (2) an output signal equal in value to said subtracted signal when said subtracted signal is not less than zero,
   (d) a multiplication circuit for multiplying said output signal by a second constant,
   means for generating a gradation correction signal by multiplying (1) a value determined from the distribution histogram of brightness level and (2) the output of the multiplication circuit, and
   means for adding said gradation correction signal to the input image signal.

2. A gradation control circuit which controls the gradation of an input image signal by adding a gradation correction signal to an input image signal, said gradation control circuit comprising:
   means for generating a distribution histogram of brightness level of the input image signal,
   means for determining a temporary gradation correction signal from the distribution histogram of brightness level,
   a gain control circuit comprising:
   (a) an inverter which inverts a gain control input signal to produce an inverted signal, said gain control input signal is a maximum value of the distribution histogram of brightness level,
   (b) means for subtracting a first constant from said inverted signal,
   (c) limiter means for generating (1) an output signal of zero value when said subtracted output signal is less than zero, and (2) an output signal equal in value to said subtracted output signal when said subtracted output signal is not less than zero, and (d) a multiplication circuit for multiplying the output signal of the limiter by a second constant, and means for generating said gradation correction signal by multiplying the temporary gradation correction signal by the output of the multiplication circuit.

* * * * *